Aug. 14, 1923.
A. CLAYPOOLE
1,464,696
LOCOMOTIVE
Filed Jan. 6, 1923
3 Sheets-Sheet 2
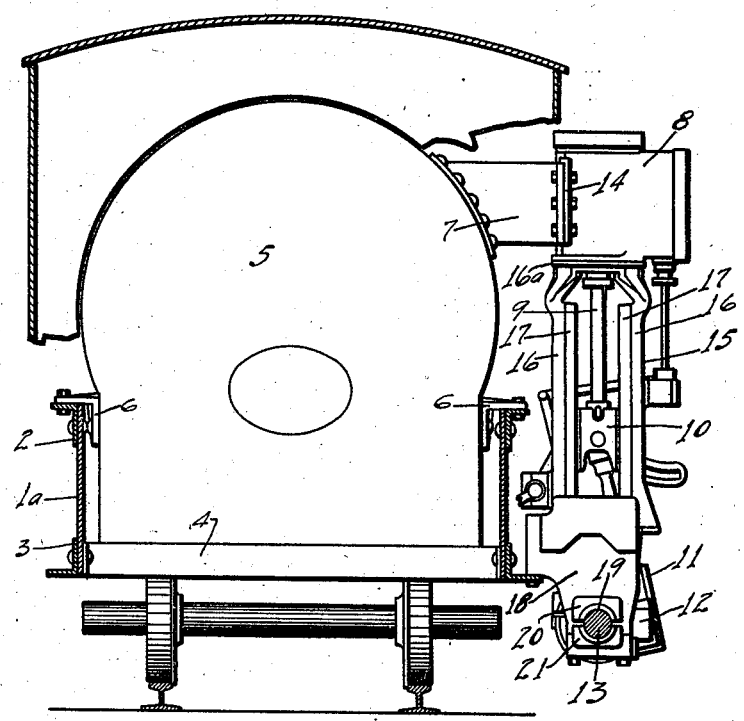

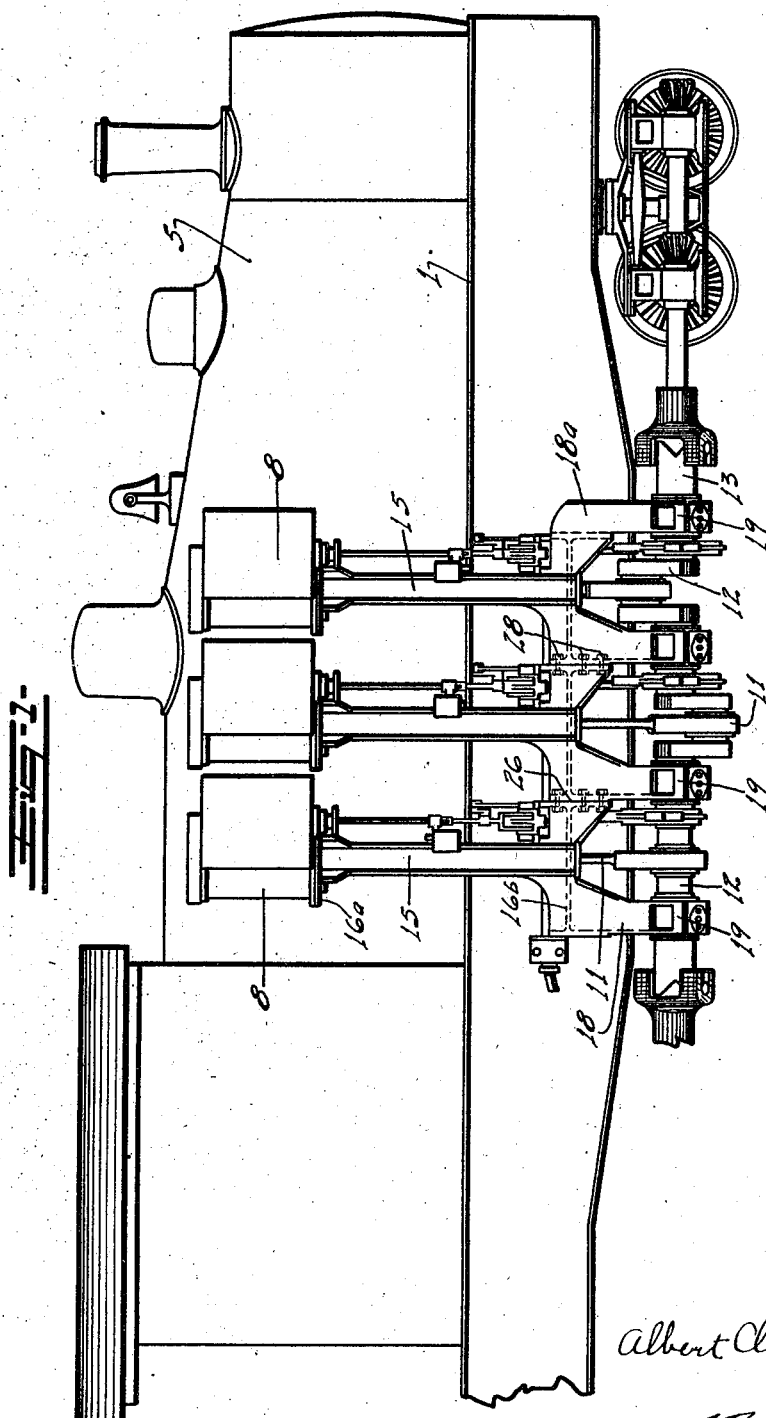

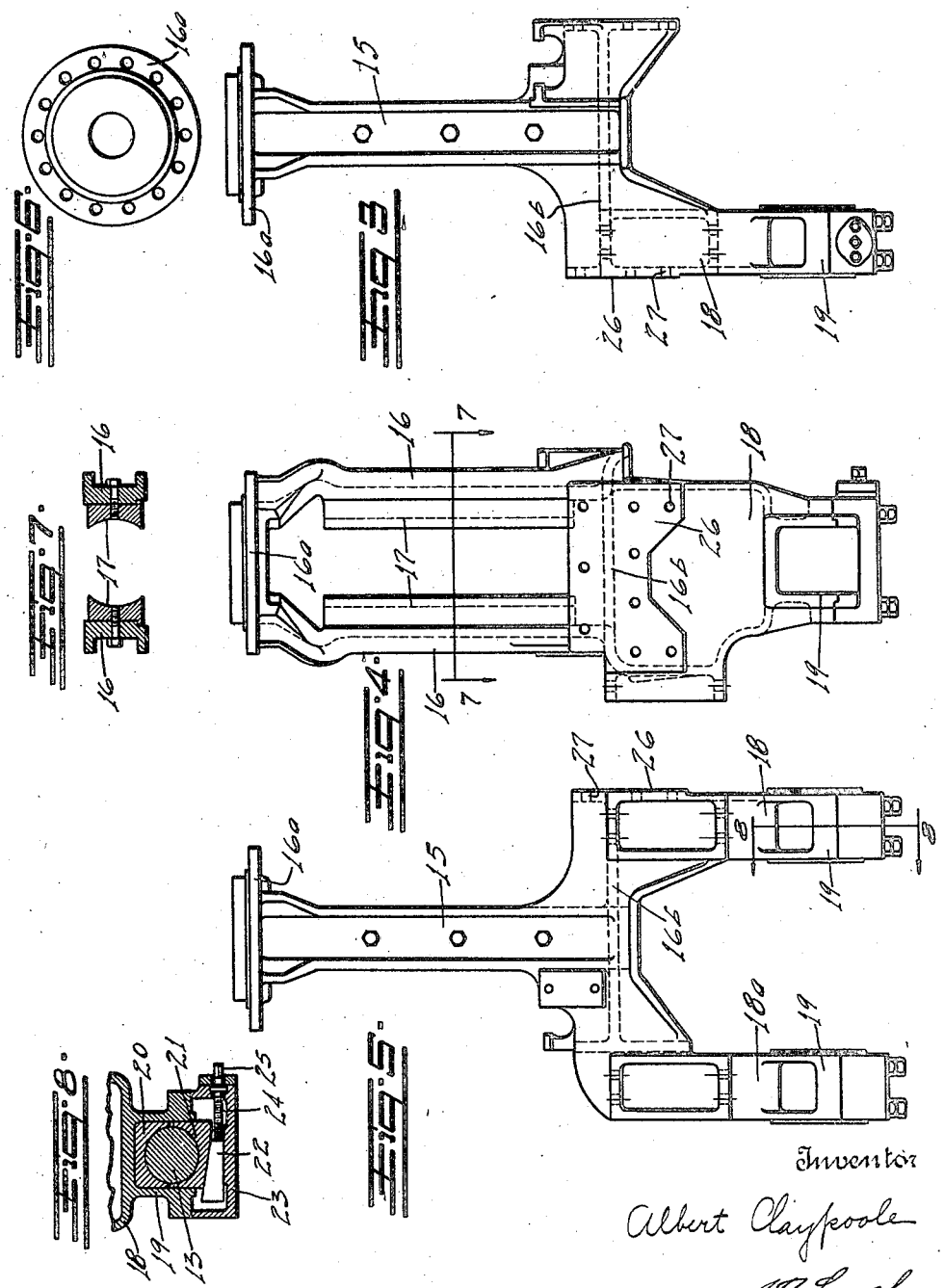

Patented Aug. 14, 1923.

1,464,696

UNITED STATES PATENT OFFICE.

ALBERT CLAYPOOLE, OF PORTLAND, OREGON, ASSIGNOR TO WILLAMETTE IRON AND STEEL WORKS, OF PORTLAND, OREGON, A CORPORATION OF OREGON.

LOCOMOTIVE.

Application filed January 6, 1923. Serial No. 611,017.

*To all whom it may concern:*

Be it known that I, ALBERT CLAYPOOLE, a citizen of the United States, residing at Portland, in the county of Multnomah and State of Oregon, have invented new and useful Improvements in Locomotives, of which the following is a specification.

The invention is particularly directed to geared locomotives and of a type in which the engines are arranged alongside of the engine boiler and frame. With such engines it is particularly desirable to have the frames sectional but at the same time have rigidity between the cylinders and bearings which receive the thrust from the cylinders. I, therefore, provide each of the cylinders of the engine with a frame section which extends through to the crank shaft bearing, the different sections being bolted together to form a rigid structure.

The invention is illustrated in the accompanying drawings as follows:—

Fig. 1 shows a side elevation of a locomotive.

Fig. 2 a transverse section through the cab.

Fig. 3 a side elevation of one of the sections.

Fig. 4 and end view of the same section.

Fig. 5 a side elevation of a section having a second crank bearing extension.

Fig. 6 a plan view of the cylinder end of one of the sections.

Fig. 7 a section on the line 7—7 in Fig. 4.

Fig. 8 a section on the line 8—8 in Fig. 5.

1 marks a locomotive frame formed with a side plate 1ª, angle plate 2 at the top and an angle plate 3 at the bottom. The plates 1ª extend around the ends and are connected at intervals by cross plates 4. A boiler 5 has the brackets 6 resting on the frame and also brackets 7 to which the engine cylinders 8 are secured. The engines have the usual piston rods 9, cross heads 10, connecting rods 11, cranks 12, and crank shaft 13. The cylinders are provided with flanges 14 which are bolted to the brackets 7. Frame sections 15 are provided, one for each cylinder. These sections are made with two upright sides 16 on which the cross head guides 17 are mounted. These sides 16 are connected at the top by a head 16ª and each of the cylinders is mounted on one of these heads. The lower ends of the uprights 16 are connected by a head 16ᵇ and an off-set extension 18 projects from the head 16ᵇ carrying a crank shaft bearing 19. The crank shaft bearing has the boxes 20—21 (see Fig. 8), the beveled key 22 operating between the bearing and a cap plate 23, the key being adjusted by a screw 24 through the action of a nut 25.

The heads 16ᵇ have opposing clamping faces 26 with registering perforations 27 through which clamping bolts 28 extend. When these clamping bolts are tightened the three sections are firmly secured together.

One of the sections, preferably the end section, has a second extension 18ª so as to give support to both sides of each crank.

While I have shown three cylinders it will readily be observed that the scheme is not limited to three cylinders and readily adapts itself to any desired extension. It will further be observed that the thrust and side strains from each cylinder are carried through an integral frame to the crank shaft bearing and that the sectional arrangement allows a simple unit construction which may be readily assembled or readily detached in sections for the purposes of repair.

What I claim as new is:—

1. In a locomotive, the combination with a locomotive frame and boiler of an engine having a plurality of cylinders; an integral frame section extending from each cylinder and having uprights carrying cross head guides; a head at the top of the uprights secured to one of the cylinders; a head at the bottom of the uprights; and an off-set extension on the bottom head carrying a mounting for a crank shaft bearing.

2. In a locomotive, the combination with a locomotive frame and boiler of an engine having a plurality of cylinders; an integral frame section extending from each cylinder and having uprights carrying cross head guides; a head at the top of the uprights secured to one of the cylinders; a head at the bottom of the uprights; an off-set extension on the bottom head carrying a mounting for a crank shaft bearing, said sections having abutting longitudinal faces; and means for clamping the sections together at the faces.

3. In a locomotive, the combination with a locomotive frame and boiler of an engine having a plurality of cylinders; an integral frame section extending from each cylinder and having uprights carrying cross head guides; a head at the top of the uprights secured to one of the cylinders; a head at the bottom of the uprights; an off-set extension on the bottom head carrying a mounting for a crank shaft bearing; and a second extension extending from one of the lower heads of the sections carrying a mounting for a crank shaft bearing.

4. In a locomotive, the combination of a locomotive frame and boiler; an engine having a plurality of cylinders; an integral frame section extending from each engine cylinder to a crank shaft bearing having a mounting for a cross head guide and an off-set extension for the crank shaft bearing, the sections having longitudinal abutting faces; and means for clamping the sections together at the faces.

5. In a locomotive the combination of a locomotive frame and boiler; an engine having a plurality of cylinders; an integral frame section extending from each engine cylinder to a crank shaft bearing having a mounting for a cross head guide and an off-set extension for the crank shaft bearing, the sections having longitudinal abutting faces; and means for clamping the sections together at the faces, one of the sections having a second off-set extension carrying a crank shaft bearing mounting.

In testimony whereof I have hereunto set my hand.

ALBERT CLAYPOOLE.